United States Patent
Lu et al.

(10) Patent No.: US 11,205,022 B2
(45) Date of Patent: Dec. 21, 2021

(54) SYSTEM AND METHOD FOR OPTIMIZING PHYSICAL CHARACTERISTICS OF A PHYSICAL DEVICE

(71) Applicant: X Development LLC, Mountain View, CA (US)

(72) Inventors: Jesse Lu, East Palo Alto, CA (US); Martin Schubert, Mountain View, CA (US); Brian Adolf, San Mateo, CA (US)

(73) Assignee: X Development LLC, Mountain View, CA (US)

( * ) Notice: Subject to any disclaimer, the term of this patent is extended or adjusted under 35 U.S.C. 154(b) by 262 days.

(21) Appl. No.: 16/244,846

(22) Filed: Jan. 10, 2019

(65) Prior Publication Data

US 2020/0226221 A1   Jul. 16, 2020

(51) Int. Cl.
*G06F 30/00* (2020.01)
*G06F 111/10* (2020.01)
*G06F 30/23* (2020.01)

(52) U.S. Cl.
CPC .............. *G06F 30/00* (2020.01); *G06F 30/23* (2020.01); *G06F 2111/10* (2020.01)

(58) Field of Classification Search
CPC ...... G06F 2111/10; G06F 30/00; G06F 30/20; G06F 30/17; G06T 17/00
See application file for complete search history.

(56) References Cited

U.S. PATENT DOCUMENTS

| 5,774,693 A | 6/1998 | Hsu et al. |
| 6,772,076 B2 | 8/2004 | Yamamoto et al. |
| 9,589,757 B1 | 3/2017 | Hannon et al. |
| 10,592,732 B1* | 3/2020 | Sather ................. G06N 3/0481 |
| 2002/0165682 A1 | 11/2002 | Doerr |
| 2004/0225483 A1 | 11/2004 | Okoniewski et al. |

(Continued)

FOREIGN PATENT DOCUMENTS

| WO | 2017/176370 A1 | 10/2017 |
| WO | 2017/223560 A1 | 12/2017 |

OTHER PUBLICATIONS

Elesin et al. "Time domain topology optimization of 3D nanophotonic devices". Photonics and Nanostructures—Fundamentals and Applications 12 (2014) 23-33. (Year: 2013).*

(Continued)

*Primary Examiner* — Eunhee Kim (74) *Attorney, Agent, or Firm* — Christensen O'Connor Johnson Kindness PLLC (57) ABSTRACT

A method and system for optimizing structural parameters of an electromagnetic device is described that includes performing operations. The operations include performing a time-forward simulation of a field response in a simulated environment describing the electromagnetic device and extracting decomposition components from the field response to compute a loss value. The operations further include backpropagating the loss value backwards in time using the decomposition components to determine an influence of changes in the structural parameters of the electromagnetic device on the loss value. The operations further include generating a revised description of the electromagnetic device by updating the structural parameters to reduce the loss value.

20 Claims, 5 Drawing Sheets

(56) References Cited

U.S. PATENT DOCUMENTS

| | | |
|---|---|---|
| 2010/0312539 A1 | 12/2010 | Yamagajo et al. |
| 2014/0365188 A1 | 12/2014 | Doerr |
| 2016/0012176 A1 | 1/2016 | Liu et al. |
| 2016/0033765 A1 | 2/2016 | Liu et al. |
| 2016/0174902 A1 | 6/2016 | Georgescu et al. |
| 2018/0018757 A1 | 1/2018 | Suzuki |
| 2018/0045953 A1* | 2/2018 | Fan .................... G02B 5/18 |
| 2019/0018155 A1* | 1/2019 | Nakshatrala .......... G01V 1/303 |
| 2019/0279094 A1* | 9/2019 | Baughman .......... G06N 3/0481 |

OTHER PUBLICATIONS

Jiang et al. "Dataless training of generative models for the inverse design of matasurfaces". arXiv preprint arXiv:1906.07843, 2019—fanlab.stanford.edu. Jun. 2019. 10 Pages. (Year: 2019).*

Hassan et al. "Topology Optimisation of Wideband Coaxial-to-Waveguide Transitions". Scientific Reports. Mar. 2017. 9 Pages. (Year: 2017).*

Iguchi et al., "Topology Optimization of Optical Waveguide Devices Based on Beam Propagation Method with Sensitivity Analysis", Journal of Lightwave Technology, IEEE vol. 34, No. 18, Sep. 15, 2016.

Sawada et al., "Development of the Wavefront Matching Method and Its Application to Si-Wire Mode Converters", Journal of Lightwave Technology, IEEE vol. 36, No. 17, Sep. 1, 2018.

International Search Report and Written Opinion, dated May 29, 2020 in corresponding International Patent Application No. PCT/US2020/012780, 21 pages.

Chen, R.T. et al., "Neural Ordinary Differential Equations", 32nd Conference on Neural Information Processing Systems (NIPS 2018), Oct. 22, 2018, 18 pages.

Petykiewicz, J. et al., "Active Nanophotonics: Inverse Design and Strained Germanium Light Emitters", A Dissertation Submitted to the Department of Electrical Engineering and the Committee on Graduate Studies of Stanford University, Oct. 2016. 134 pages.

Ying-Shou Lu, J., "Nanophotonic Computational Design", A Dissertation Submitted to the Department of Electrical Engineering and the Committee on Graduate Studies of Stanford University, Jun. 2013, 122 pages.

Piggott, A.Y., "Automated Design of Photonic Devices", A Dissertation Submitted to the Department of Electrical Engineering and the Committee on Graduate Studies of Stanford University, Jun. 2018, 112 pages.

Lu, J. et al., "Nanophotonic Computational Design", Optics Express, vol. 21, No. 11, Jun. 3, 2013, 17 pages.

Piggott, A. Y. et al., "Inverse Design and Implementation of a Wavelength Demultiplexing Grating Coupler", Scientific Reports, Nov. 27, 2014, 5 pages.

Piggott, A.Y. et al., "Inverse Design and Demonstration of a Compact and Broadband On-Chip Wavelength Demultiplexer", Nature Photonics, May 11, 2015, 5 pages.

Piggott, A.Y. et al., "Silicon Photonics: Design Approach to Integrated Photonics Explores Entire Space of Fabricable Devices", Laser Focus World, Aug. 13, 2018, 5 pages.

Piggott, A. Y. et al., "Fabrication-constrained Nanophotonic Inverse Design", Scientific Reports, May 11, 2017, 7 pages.

Su, L. et al., "Inverse Design and Demonstration of a Concept On-Chip Narrowband Three-Channel Wavelength Demultiplexer", ACS Photonics, Aug. 17, 2017, 6 pages.

Su, L. et al., Fully-Automated Optimization of Grating Couplers, Optics Express, vol. 26, No. 4m Feb. 2018, 12 pages.

Robinson, J.T., "First-Principle Derivation of Gain in High-Index-Contrast Waveguides", Optics Express, vol. 16, No. 21, Oct. 13, 2008, 11 pages.

Lalau-Keraly, C.M. et al., "Adjoint Shape Optimization Applied to Electromagnetic Design", Optical Society of America, 2013, 9 pages.

* cited by examiner

SYSTEM AND METHOD FOR OPTIMIZING PHYSICAL CHARACTERISTICS OF A PHYSICAL DEVICE

TECHNICAL FIELD

This disclosure relates generally to design tools, and in particular but not exclusively, relates to design tools for optical and electromagnetic devices.

BACKGROUND INFORMATION

Optical and electromagnetic devices are devices that create, manipulate, propagate, and/or measure electromagnetic radiation. Their applications vary broadly and include, but are not limited to, acousto-optic modulators, optical modulators, optical ring resonators, distributed Bragg reflectors, lasers, lenses, transistors, waveguides, antennas, and the like. Design of these devices is sometimes determined through a simple guess and check method in which a small number of design parameters of a pre-determined design are adjusted for suitability to a particular application. However, in actuality, these devices may have design parameters ranging from hundreds all the way to many billions, dependent on the device size and functionality. As functionality of these optical and electromagnetic devices is increased and manufacturing improves to allow for smaller device feature sizes, it becomes increasingly important to take full advantage of these improvements via optimized device design.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. Not all instances of an element are necessarily labeled so as not to clutter the drawings where appropriate. The drawings are not necessarily to scale, emphasis instead being placed upon illustrating the principles being described.

DETAILED DESCRIPTION

Embodiments of a system and method for optimizing physical characteristics of a physical device are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Described herein are embodiments of a physics simulator that may be utilized to optimize structural parameters of electromagnetic and other devices based on first-principles simulations. In particular, the physics simulator allows for a first-principles based design and optimization of devices based on their optical, electrical, magnetic, acoustic, and/or fluidic response (e.g., field response) to an excitation source. The physics simulator utilizes physical partial-differential equation (PDE) systems to model these optical, electrical, mechanical, fluidic, quantum dynamic, and the like systems in a time-forward simulation followed by backpropagation to determine the influence of structural parameters of the devices on the field response. However, the large state sizes (e.g., the devices being represented in three-dimensions, or other dimensionality, by a quantity of voxels ranging from hundreds all the way to many billions) and simulation time steps (e.g., from hundreds to millions or billions of time steps) necessary to simulate these devices using the PDE systems may make them intractable in terms of memory footprint for backpropagation (or even the time-forward simulation) in even the largest data centers.

To reduce the memory footprint for the backpropagation, linear PDEs are leveraged to model the field response represented with a reduced dimensionality. In other words, instead of storing the field response at every point in time of the time-forward simulation to perform the backpropagation, only a single (e.g., combined) state of the time-forward simulation is stored. For example, rather than storing the field response for every voxel at every time point, the field response over time is represented in a different domain (e.g., via Fourier components at one or more frequencies of interest) that reduces the dimensionality required to store the field response. The reduced representation of the field response may correspond to decomposition components (e.g., Fourier components) extracted while performing the time-forward simulation. The decomposition components may subsequently be utilized to perform the backpropagation.

In one embodiment, a scheme that does not significantly increase the computational cost of performing the backpropagation while storing a single state of the time-forward simulation is utilized rather than storing the state of the time-forward simulation at every time step. Such a scheme is realized by taking a running Fourier transform (e.g., extracting decomposition components) of the field response during the time-forward simulation at one or more frequencies of interest and determining a loss value (e.g., function) against this result. The loss value is backpropagated to every state of the simulation backwards in time using the decomposition components to determine an influence of changes in the structural parameters of the device on the loss value.

Alternatively, backpropagating the loss value with the decomposition components may be described as taking a running Fourier transform backwards in time to determine decomposition components of the loss gradient (e.g., change in loss value with respect to field response). The decomposition components of the field response (e.g., field gradient) and the loss gradient may then be combined to determine a structural gradient which corresponds to at least a contribution to the influence of changes in the structural parameters on the loss value at a particular time step. These structural parameters may correspond to gradients of interest such as the location of a material boundary, density of a material at a certain point, relative permittivity (i.e., dielectric constant), index of refraction, device geometry, and the like.

As mentioned above, the physics simulator allows for first-principles based design of novel devices with a reduced memory footprint (e.g., tractable) by modeling field response of the device with linear PDE systems that may subsequently be described by a reduced dimensionality representation. This has applications in a wide variety of fields, including but not limited to, mechanical devices, optical devices, electromagnetic devices, quantum-dynamic devices, lasers, lenses, mechanical structures, transistors, and the like. Advantageously, this first-principles based design is not dependent on human intuition or expertise and generally may result in designs which outstrip current state-of-the-art designs as simultaneous, scalable optimization of a nearly unlimited number of design parameters may be achieved.

Figure 1:
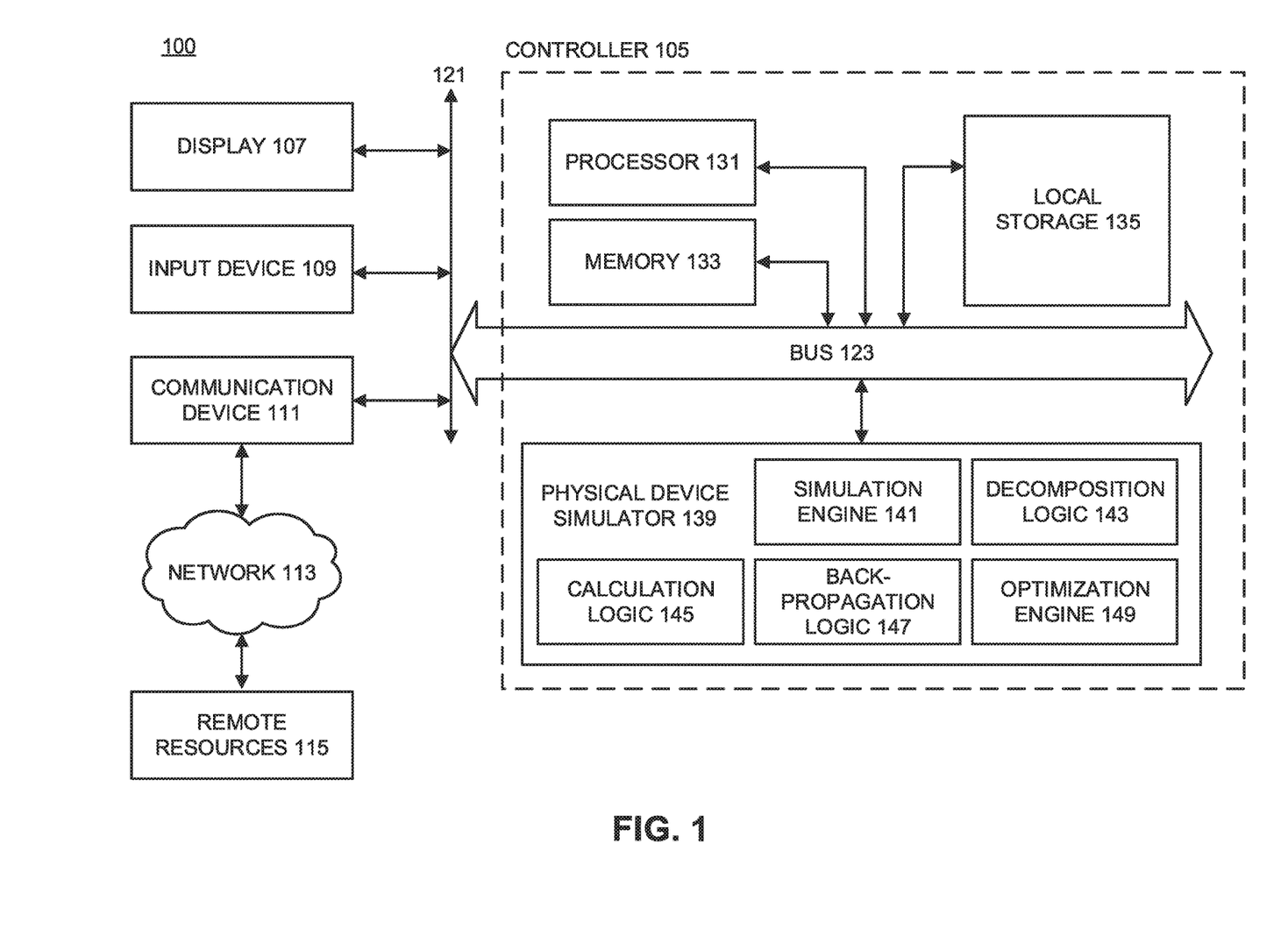
FIG. 1 is a functional block diagram illustrating a system for optimizing structural parameters of an electromagnetic device, in accordance with an embodiment of the present disclosure.

FIG. 1 is a functional block diagram illustrating system 100 for optimizing structural parameters of an electromagnetic device, in accordance with an embodiment of the present disclosure. In the following embodiments, the system 100 will be described in the context of an optical waveguide as corresponding to the electromagnetic device. However, it is appreciated that the electromagnetic device is not limited to optical waveguides, and that other electromagnetic devices such as lasers, lenses, transistors, optical devices, quantum-dynamic devices, antennas, optoelectronic switches, mechanical structures, and the like may be represented by the term "electromagnetic device." The system 100 provides first-principles based design and optimization of devices based on their optical, electrical, magnetic, acoustic, and/or fluidic response (e.g., field response) to an excitation source. In other words, it is appreciated that the system 100 is not limited to modeling electromagnetic devices and that other devices having a field response to an excitation source may also be modeled and subsequently having structural parameters optimized.

As illustrated, system 100 includes controller 105, display 107, input device(s) 109, communication device(s) 111, network 113, remote resources 115, bus 121 and bus 123. Controller 105 includes processor 131, memory 133, local storage 135, and physical device simulator 139. Physical device simulator 139 includes simulation engine 141, decomposition logic 143, calculation logic 145, backpropagation logic 147, and optimization engine 149. It is appreciated that in some embodiments, controller 105 may be a distributed system.

Controller 105 is coupled to display 107 (e.g., a light emitting diode display, a liquid crystal display, and the like) coupled to bus 121 through bus 123 for displaying information to a user utilizing system 100 to optimize structural parameters of the electromagnetic device. Input device 109 is coupled to bus 121 through bus 123 for communicating information and command selections to processor 131. Input device 109 may include a mouse, trackball, keyboard, stylus, or other computer peripheral, to facilitate an interaction between the user and controller 105. In response, controller 105 may provide verification of the interaction through display 107.

Another device, which may optionally be coupled to controller 105, is a communication device 111 for accessing remote resources 115 of a distributed system via network 113. Communication device 111 may include any of a number of networking peripheral device such as those used for coupling to an Ethernet, token ring, Internet, or wide area network. Communication device 111 may further include a null-modem connection, or any other mechanism that provides connectivity between controller 105 and the outside world. Note that any or all of the components of system 100 illustrated in FIG. 1 and associated hardware may be used in various embodiments of the present disclosure. The remote resources 115 may be part of a distributed system and include any number of processors, memory, and other resources for optimizing the structural parameters of the electromagnetic device.

The controller 105 orchestrates the operation of the system 100 for optimizing the structural parameters of the electromagnetic device. Processor 131 (e.g., one or more central processing units, graphics processing units, and/or tensor processing units, etc.), memory 133 (e.g., volatile memory such as DRAM and SRAM, non-volatile memory such as ROM, flash memory, and the like), local storage 135 (e.g., magnetic memory such as computer disk drives), and the physical device simulator 139 are coupled to each other through bus 123. Controller 105 includes software (e.g., instructions included in memory 133 coupled to processor 131) and/or hardware logic (e.g., application specific integrated circuits, field-programmable gate arrays, and the like) that when executed by controller 105 causes the controller 105 or the system 100 to perform operations. The operations may be based on instructions stored within any one of, or a combination of, memory 133, local storage 135, physical device simulator 139, and remote resources 115 accessed through network 113.

In the illustrated embodiment, the modules 141-149 of the physical device simulator 139 are utilized to optimize the structural parameters of the electromagnetic device. In some embodiments, system 100 may optimize the structural parameters of the electromagnetic device may be achieved via, inter alia, simulations (e.g., time-forward and back-propagation) that utilizes a finite-difference time-domain (FDTD) method to model the field response (e.g., both electric and magnetic). The simulation engine 141 provides instructions for performing time-forward and backwards simulations of a simulated environment describing the electromagnetic device. In particular the simulation determines a field response of the simulated environment in response to an excitation source. The decomposition logic 143 extracts decomposition components from the field response associated with a performance parameter of the electromagnetic device. The calculation logic 145 computes a loss value based, at least in part, on a difference between the performance parameter of the electromagnetic device and a desired performance value. The backpropagation logic 147 in combination with the simulation engine 141 backpropagates the loss value backwards in time using the decomposition components to determine an influence of changes in the structural parameters on the loss value. The optimization engine 149 is utilized to optimize the structural parameters of the electromagnetic device to reduce the loss value.

Figure 2A:
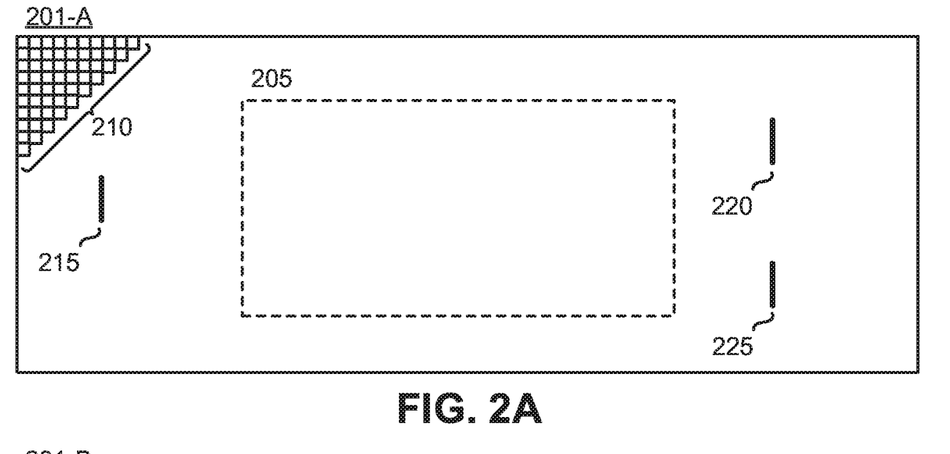
FIG. 2A illustrates an example rendering of a simulated environment describing an electromagnetic device, in accordance with an embodiment of the present disclosure.
Figure 2B:
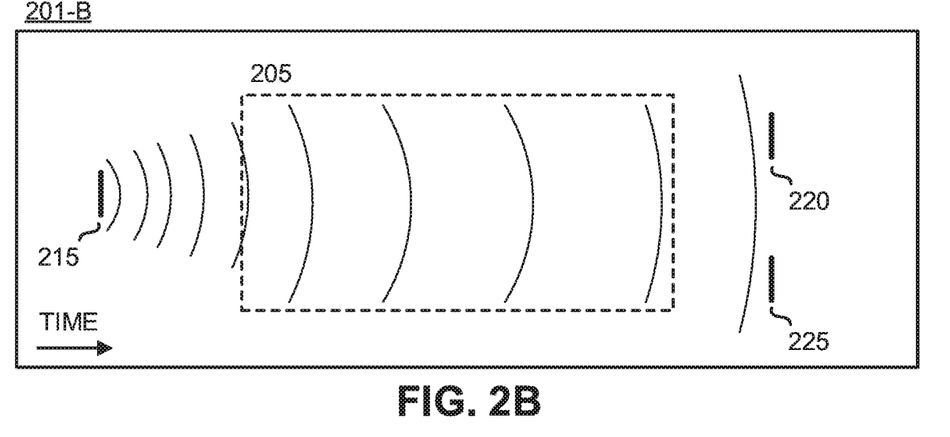
FIG. 2B illustrates an example time-forward simulation of a field response in a simulated environment in response to an excitation source, in accordance with an embodiment of the present disclosure.
Figure 2C:
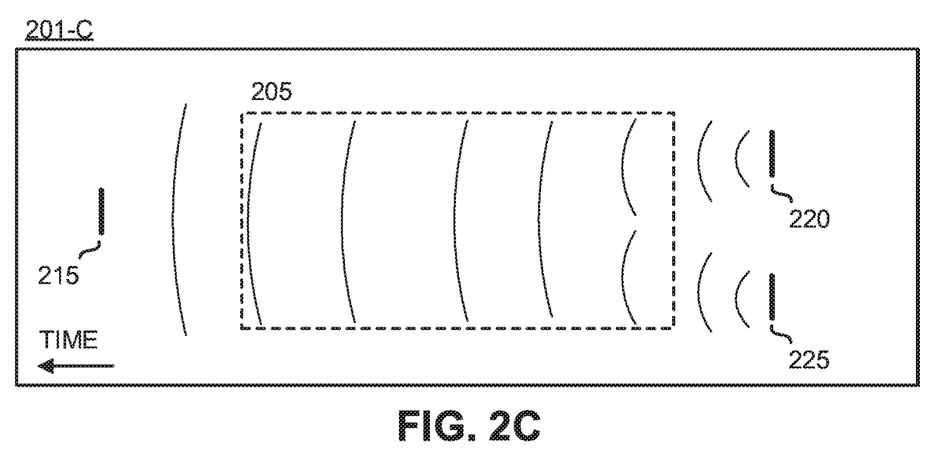
FIG. 2C illustrates an example backpropagation of a loss value backwards in time within a simulated environment, in accordance with an embodiment of the present disclosure.

FIGS. 2A-2C illustrate an initial set up, a time-forward simulation, and backpropagation of a simulated environment 201 for optimizing structural parameters of an electromagnetic device. The simulated environment 201 and corresponding initial set up, time-forward simulation, backpropagation, and structural parameter optimization may be achieved via a physics simulator such as that described by system 100 illustrated in FIG. 1. As illustrated in FIGS. 2A-2C, the simulated environment is represented in two-dimensions, however it is appreciated that higher (e.g., 3-dimensional space) and lower (e.g., 1-dimensional space) dimensionality may also be used to describe the simulated environment 201 and electromagnetic device. In some embodiments, the optimization of the structural parameters of the electromagnetic device illustrated in FIGS. 2A-2C may be achieved via, inter alia, simulations (e.g., time-forward and backpropagation) that utilizes a finite-difference time-domain (FDTD) method to model the field response (e.g., both electric and magnetic).

FIG. 2A illustrates an example rendering of a simulated environment 201-A describing an electromagnetic device, in accordance with an embodiment of the present disclosure. The simulated environment 201-A represents the simulated environment 201 at an initial time step (e.g., an initial set up) for optimizing structural parameters of the electromagnetic device. The electromagnetic device described by the simulated environment 201 may correspond to an optical waveguide having a designable region 205 in which the structural parameters of the simulated environment may be designed, modified, or otherwise changed. The simulated environment 201 includes an excitation source 215 (e.g., a gaussian pulse, a wave, a waveguide mode response, and the like). The electrical and magnetic fields within the simulated environment 201 (and subsequently the electromagnetic device) may change (e.g., field response) in response to the excitation source 215. The electromagnetic device includes waveguide output ports 220 and 225, which may be used for determining a performance parameter or metric of the electromagnetic device in response to the excitation source 215. The specific settings of the initial structural parameters, excitation source, performance parameters, and other metrics for a first-principles simulation of an electromagnetic device are input before the time-forward simulation starts. These specific values and parameters may be defined directly by a user (e.g., of the system 100 in FIG. 1), indirectly (e.g., via the controller 105 culling pre-determined values stored in memory 133, local storage 135, or remote resources 115), or a combination thereof.

As illustrated, the simulated environment 201 (and subsequently the electromagnetic device) is described by a plurality of voxels 210, which represent individual elements of the two-dimensional (or three-dimensional) space of the simulated environment. Each of the voxels is illustrated as two-dimensional squares, however it is appreciated that the voxels may be represented as cubes or other shapes in three-dimensional space. It is appreciated that the specific shape and dimensionality of the plurality of voxels 210 may be adjusted dependent on the simulated environment 201. It is further noted that only a portion of the plurality of voxels 210 are illustrated to avoid obscuring other aspects of the simulated environment 201. Each of the plurality of voxels 210 is associated with at least a structural value to describe the structural parameters, a field value to describe a field response, and a source value to describe the excitation source at a specific position within the simulated environment 201. The field response, for example, may correspond to a vector describing the electric and/or magnetic field at a particular time step for each of the plurality of voxels 210. More specifically, the vector may correspond to a Yee lattice to discretize Maxwell's equations for determining the field response. In some embodiments, the field response is based, at least in part, on the structural parameters and the excitation source 215.

FIG. 2B illustrates an example time-forward simulation of the simulated environment 201-B describing the electromagnetic device, in accordance with an embodiment of the present disclosure. The rendered simulated environment 201-B represents the time-forward simulation at a particular time step in which the excitation source 215 is active (e.g., generating waves originating at the excitation source 215 that propagate through the simulated environment 201). In one embodiment, the electromagnetic device is an optical waveguide operating at the frequency of interest and having a particular waveguide mode (e.g., transverse electromagnetic mode, transverse electric mode, etc.) and the excitation source is at an input of the optical waveguide having a specified spatial, phase, and temporal profile. The time-forward simulation occurs over a plurality of time steps, including the illustrated time step. When performing the time-forward simulation, changes to the field response (e.g., the field value) for each of the plurality of voxels 210 are updated in response to the excitation source 215 and based, at least in part, on the structural parameters of the electromagnetic device at each of the plurality of time steps. Similarly, in some embodiments the source value is updated for each of the plurality of voxels (e.g., in response to the electromagnetic waves from the excitation source 215 propagating through the simulated environment). It is appreciated that the time-forward simulation is incremental and that the field value (and source value) is updated incrementally at each time step as time moves forward for each of the plurality of time steps. It is further noted that in some embodiments, the update is an iterative process and that the update of each field and source value is based, at least in part, on the previous update of each field and source value.

When performing the time-forward simulation, decomposition components from the field response associated with a performance parameter of the electromagnetic device are extracted. In one embodiment, the performance parameter corresponds to the amount of a desired output mode of the waveguide output port 220 and 225. Extracting the decomposition components may correspond to extracting Fourier components of the performance parameter as a function of time. The performance parameter represents power (at one or more frequencies of interest) in the desired mode shape at the specific locations of the output ports 220 and 225. A loss value may subsequently be computed based, at least in part, on a difference between the performance parameter at a time step (e.g. a final time step of the time-forward simulation) and a desired performance value. The loss value may be determined by a loss function which describes the relationship between the performance parameter and the desired performance value. In other words, a running Fourier transform may be applied to each of the plurality of time steps of the time-forward simulation at one or more frequencies of interest and a loss function may subsequently be applied against this result.

FIG. 2C illustrates an example backpropagation of the loss value backwards in time within the simulated environment 201-C describing the electromagnetic device, in accordance with an embodiment of the present disclosure. The backpropagation of the loss value is performed backwards in time from the time step (e.g., the final time step of the time-forward simulation) using the decomposition components to determine an influence in changes of the structural parameters of the electromagnetic device on the loss value. As illustrated, the loss value is backpropagated in time for each of the plurality of time steps (e.g., of the time-forward simulation, but in reverse). In some embodiments, the backpropagation corresponds as a time-backwards simulation in which the excitation source of the simulated environment 201 is based, at least in part, on the loss value. In other words, the loss value determined at the waveguide output ports 220 and 225 corresponds as the excitation source during the backpropagation. A change in the field response of each of the plurality of voxels is incrementally updated for each of the plurality of time steps backwards in time based, at least in part, on the loss value. The change in the field response based on the loss value corresponds to a loss gradient (a change in the loss value with respect to the field response for each of the plurality of voxels 210) over time.

While performing the time-backwards simulation, a running Fourier transform backwards in time is taken to determine decomposition components of the loss gradient. The decomposition components of the field response (e.g., field gradient) and the loss gradient may then be combined to determine a structural gradient which corresponds to the contribution to the influence of changes in the structural parameters on the loss value at a particular time step. The decomposition components of the field response are utilized to determine the field gradient rather than using stored values of the field response for each of the plurality of voxels 210 at each time step. This allows for backpropagation to determine the structural gradient to be performed memory efficiently (e.g., reduced memory footprint).

In some embodiments, iterative cycles of the time-forward simulation and backpropagation are performed successively using an optimization scheme such as gradient descent to adjust the structural parameters of the electromagnetic device. More specifically, after each of the cycles adjustments to the structural parameters (e.g., optimization) are made to reduce the loss value. The time-forward simulation, backpropagation, and optimization are repeated successively until the loss value substantially converges such that the difference between the performance parameter and the desired performance value is within a threshold range. In some embodiments, the loss signal is iteratively reduced (and structural parameters adjusted/optimized) via a gradient descent algorithm, or some other optimization scheme. In the same or other embodiments, it is determined whether a change or adjustment to the structural parameters when performing a cycle of the time-forward simulation and backpropagation is within pre-determined fabrication constraints. This may mitigate the optimization of the structural parameters from suggesting adjustments which are not feasible from a manufacturing perspective (e.g., aspect ratio of a geometric boundary is too sharp to be manufactured).

Figure 3A:
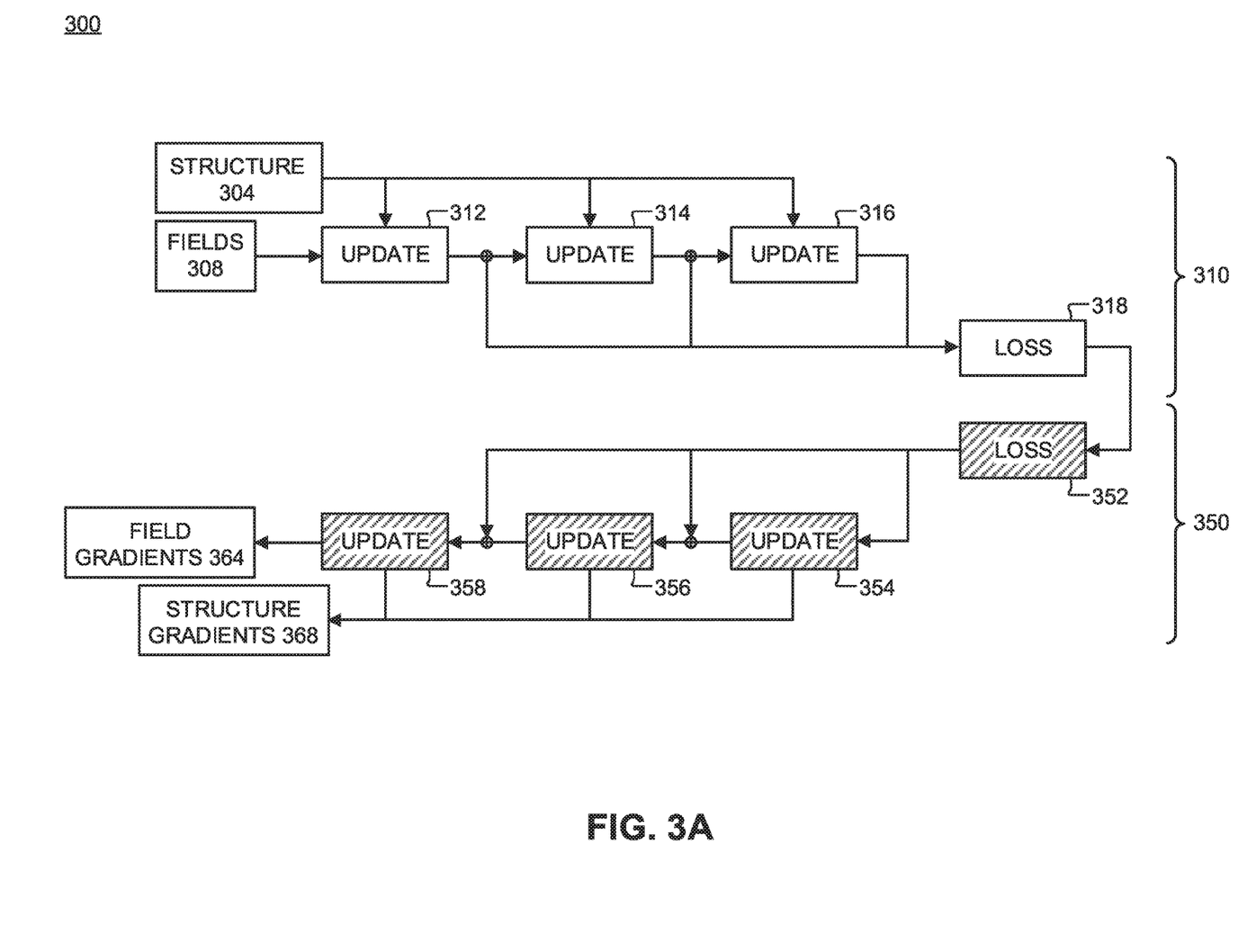
FIG. 3A is a flow chart illustrating example time steps for time-forward simulation and backpropagation within a simulated environment, in accordance with an embodiment of the present disclosure.

FIG. 3A is a flow chart 300 illustrating example time steps for the time-forward simulation 310 and backpropagation 350 within a simulated environment, in accordance with an embodiment of the present disclosure. Flow chart 300 is one possible implementation that a system (e.g., system 100 of FIG. 1) may use to perform the time-forward simulation 310 and backpropagation 350 of the simulated environment (e.g., simulated environment 201 of FIGS. 2A-2C) describing an electromagnetic or other device. In the illustrated embodiment, the time-forward simulation utilizes a finite-difference time-domain (FDTD) method to model the field response (both electric and magnetic) at a plurality of time steps in response to an excitation source. More specifically, the time-dependent Maxwell's equations (in partial differential form) are discretized to solve for field vector components (e.g. the field response of each of the plurality of voxels 210 of the simulated environment 201 in FIGS. 2A-2C) over a plurality of time steps.

As illustrated in FIG. 3A, the flow chart 300 includes portions of a time-forward simulation 310 and backpropagation 350. The time-forward simulation 310 occurs over a plurality of time steps (e.g., from an initial time to a final time step over a pre-determined number of time steps having a specified time step size) and models the field response 308 (e.g., changes in electric and magnetic fields of a simulated environment and/or electromagnetic device) based on structural parameters 304 of the simulated environment and/or electromagnetic device in response to an excitation source. For example, update operation 314 updates the field response 308 based on the field response determined from the previous update operation 312 and the structural parameters 304. Similarly, update operation 316 updates the field response 308 based on the field response determined from the update operation 314. In other words, at each time step of the time-forward simulation the field response is updated based on the previous field response and on the structural parameters of the electromagnetic device. Additionally, at each time step a contribution to the loss value (e.g., loss function) is tracked until the final time step is reached in order to determine the total loss (e.g., the loss value). The contribution to the loss value based on the field response 308 may correspond to a performance parameter of the electromagnetic device compared to a desired performance value.

Rather than storing the field response 308 at each of the plurality of time steps for each of the plurality of voxels, the contribution to the loss value may be tracked by extracting decomposition components (e.g., in order to provide a reduced representation of the field response/loss contribution). The loss value 318 may then be utilized as an excitation source (e.g., loss 352), which may be backpropagated (e.g., as in a time-backwards simulation) using the decomposition components as field gradients 364 to perform the update operations 354, 356, 358 to determine a contribution or influence of changes to the structural parameters (e.g., structure gradients 368) to the loss value.

In the illustrated embodiment, the FDTD solve (e.g., time-forward simulation 310) and backpropagation 350 problem are described pictorially, from a high-level, using only "update" and "loss" operations as well as their corresponding gradient operations. The simulation is set up initially in which the structure parameters, the excitation source, and the initial field states of the simulated environment (and electromagnetic device) are provided. As discussed previously, the field states are updated in response to the excitation source based on the structural parameters. More specifically, the update operation is given by $\phi$, where $x_{i+1} = \phi(x_i, b_i, z)$ for $i=1, \ldots n$. Here, n corresponds to the total number of time steps (e.g., the plurality of time steps) for the time-forward simulation, $x_i$ corresponds to the field response (the field value associated with the electric and magnetic fields of each of the plurality of voxels) of the simulated environment at time step $i$, $b_i$ corresponds to the excitation source(s) (the source value associated with the electric and magnetic fields for each of the plurality of voxels) of the simulated environment at time step $i$, and z corresponds to the structural parameters describing the topology and/or material properties of the electromagnetic device.

It is noted that using the FDTD method, the update operation can specifically be stated as:

$$\phi(x_i, b_i, z) = A(z)\mathcal{X}_i + B(z)b_i \quad (1)$$

That is to say the FDTD update is linear with respect to the field and source terms. Concretely, $A(z) \in \mathbb{R}^{N \times N}$ and $B(z) \in \mathbb{R}^{N \times N}$ are linear operators which depend on the structure parameters, z, and act on the fields, $\mathcal{X}_i$ and the sources, $b_i$ respectively. Here, it is assumed that $x_i, b_i, \in \mathbb{R}^N$ where N is the number of FDTD field components in the time-forward simulation. Additionally, the loss operation is given by $L = (\mathcal{X}_i, \ldots, x_n)$, which takes as input the computed fields and produces a single, real-valued scalar (e.g., the loss value) that can be reduced and/or minimized.

In terms of optimizing the structural parameters of the electromagnetic device, the relevant quantity to produce is $$\frac{dL}{dz},$$

which is used to describe the change in the loss value with respect to a change in the structural parameters of the electromagnetic device and is denoted as the "structural gradient" illustrated in FIG. 3A.

Figure 3B:
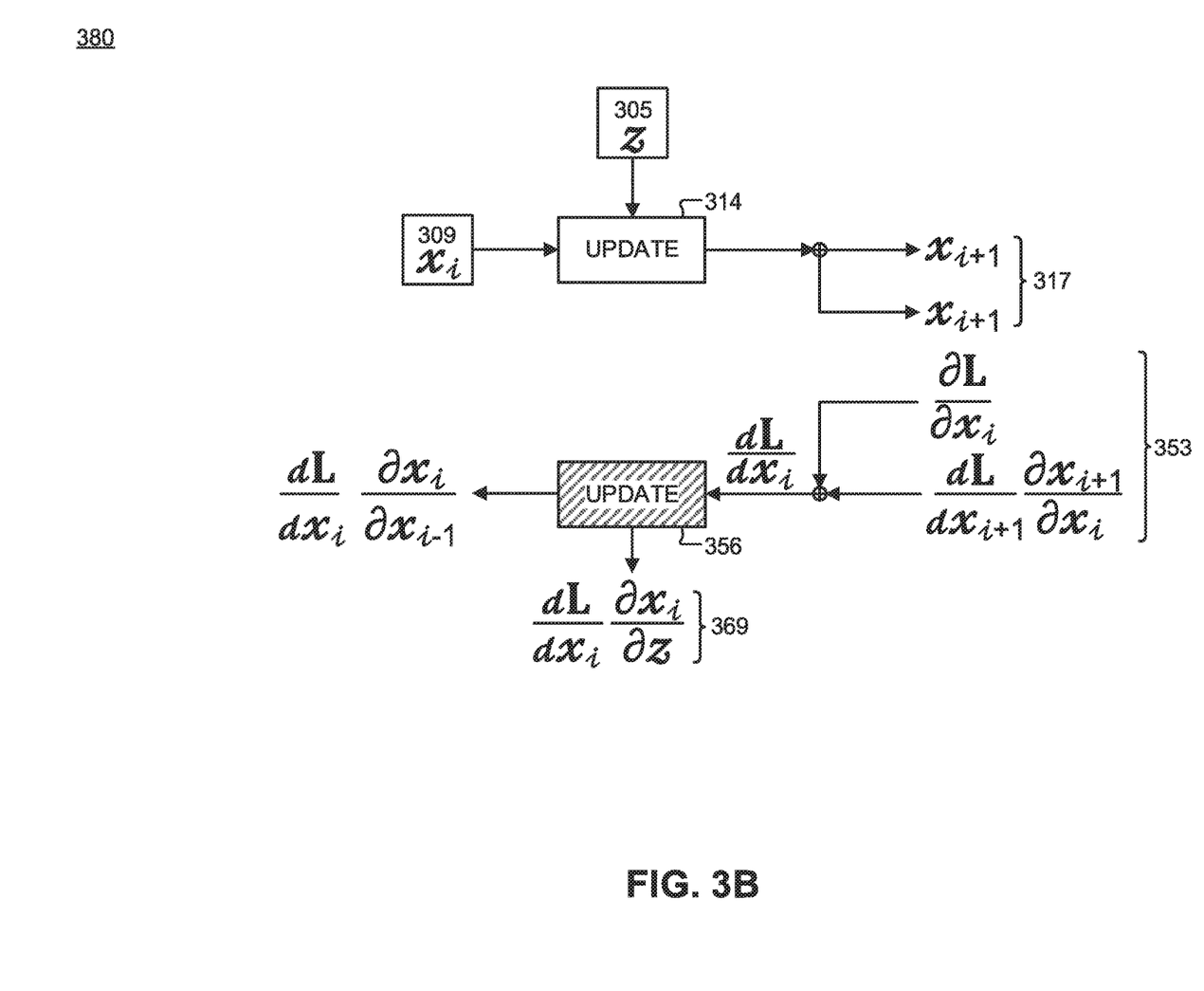
FIG. 3B is a chart illustrating a relationship between a time-forward simulation and backpropagation, in accordance with an embodiment of the present disclosure.

FIG. 3B is a chart 380 illustrating the relationship between the update operation for the time-forward simulation and the backpropagation, in accordance with an embodiment of the present disclosure. More specifically, FIG. 3B summarizes the time-forward and backpropagation relationships that are involved in computing $$\frac{dL}{dz},$$

which include $$\frac{\partial L}{\partial x_i}, \frac{\partial x_{i+1}}{\partial x_i}, \frac{dL}{dx_i}, \text{ and } \frac{\partial x_i}{\partial z}.$$

The update operation 314 updates the field 309, $\mathcal{X}_i$, based on the structural parameters 305, z, to the next field 317, $\mathcal{X}_{i+1}$. The gradients 353 are utilized to determine $$\frac{dL}{dx_i}$$

for the backpropagation (e.g., update operation 356 backwards in time) which combined with the gradients 369 are used, at least in part, to calculate $$\frac{dL}{dz}, \frac{\partial L}{\partial x_i}$$

is the contribution of each field to L. It is noted that this is the partial derivative, and therefore does not take into account the causal relationship of $x_i \rightarrow \mathcal{X}_{i+1}$. Thus, $$\frac{\partial x_{i+1}}{\partial x_i}$$

is utilized which encompasses the $x_i \rightarrow \mathcal{X}_{i+1}$ relationship.

$$\frac{dL}{dx_i}$$

is also used to compute $$\frac{dL}{dz}$$

and corresponds to the total derivative of the field with respect to L, where $$\frac{dL}{dx_i} = \frac{\partial L}{\partial x_i} + \frac{dL}{dx_{i+1}}\frac{\partial x_{i+1}}{\partial x_i}.$$

Finally, $$\frac{\partial x_i}{\partial z}$$

is used which is the contribution to $$\frac{dL}{dz}$$

from each time/update step.

In particular, the memory footprint to directly compute $$\frac{\partial L}{\partial x_i} \text{ and } \frac{dL}{dz}$$

is so large that it is intractable to store more than a handful of state Tensors. The state Tensor corresponds to storing the values of all of the FDTD cells (e.g., the plurality of voxels) for a single simulation time step. It is appreciated that the term "tensor" may refer to tensors in a mathematical sense or as described by the TensorFlow framework developed by Alphabet, Inc. In some embodiments the term "tensor" refers a mathematical tensor which corresponds to a multi-dimensional array that follows specific transformation laws. However, in most embodiments, the term "tensor" refers to TensorFlow tensors, in which a tensor is described as a generalization of vectors and matrices to potentially higher dimensions (e.g., n-dimensional arrays of base data types), and is not necessarily limited to specific transformation laws. For example, for the general loss function $f$, it may be necessary to store the fields, $\mathcal{X}_i$ for all time steps, $i$. This is because, for most choices of $f$, the gradient will be a function of the arguments of $f$. This difficulty is compounded by the fact that the values of $$\frac{\partial L}{\partial x_i}$$

for larger values of $i$ are needed before the values for smaller $i$, which may prevent the use of schemes that attempt to store only the values $$\frac{\partial L}{\partial x_i},$$

at the immediate time step.

An additional difficulty in performing the backpropagation without a reduced representation is further illustrated when computing $$\frac{dL}{dz},$$

which is given by:

$$\frac{dL}{dz} = \Sigma_i \frac{dL}{dx_i} \frac{\partial x_i}{\partial z}. \quad (2)$$

For completeness, the full form of the first time in the sum, $$\frac{dL}{dz},$$

is expressed as:

$$\frac{dL}{dx_i} = \frac{\partial L}{\partial x_i} + \frac{dL}{dx_{i+1}} \frac{\partial x_{i+1}}{\partial x_i}. \quad (3)$$

Based on the definition of $\phi$ as described by equation (1), it is noted that $$\frac{\partial x_{i+1}}{\partial x_i} = A(z),$$

which can be substituted in equation (3) to arrive at an adjoint update for backpropagation (e.g., the update operations such as update operation 356), which can be expressed as:

$$\frac{dL}{dx_i} = \frac{\partial L}{\partial x_i} + \frac{dL}{dx_{i+1}} A(z), \quad (4)$$

or $$\nabla_{x_i} L = A(z)^T \nabla_{x_{i+1}} L + \frac{\partial L^T}{\partial x_i}. \quad (5)$$

The adjoint update is the backpropagation of the loss gradients from later to earlier time steps and may be referred to as a backwards solve for $$\frac{dL}{dx_i}.$$

The second term in the sum, $$\frac{dx_i}{dz},$$

is denoted as:

$$\frac{\partial x_i}{\partial z} = \frac{d\phi(\mathcal{X}_{i-1}, \mathcal{E}_{i-1}, z)}{dz} = \frac{dA(z)}{dz} \mathcal{X}_{i-1} + \frac{dB(z)}{dz} \mathcal{E}_{i-1},$$

for the particular form of $\phi$ described by equation (1). Thus, without reduced representation, each term of the sum associated $$\frac{dL}{dz}$$

depends on both $$\frac{dL}{dx_{i_0}}$$

for $i \geq i_0$ and $\mathcal{X}_{i_0}$ for $i < i_0$. Since the dependency chains of these two terms are in opposite directions, it is concluded that computing $$\frac{dL}{dz}$$

in this way (e.g., without reduced representation) also requires the storage of $\mathcal{X}_i$ values for all of i, which is assumed to be intractable.

It is noted that $$\frac{\partial x_i}{\partial z}$$

is linear with respect to $\mathcal{X}_{i\text{-}1}$ and $\mathcal{E}_{i\text{-}1}$, which is a direct consequence of the linearity of φ with respect to $\mathcal{X}_i$ and $\mathcal{E}_i$. This linearity will be leveraged to compute $$\frac{\partial L}{\partial x_i} \text{ and } \frac{dL}{dz}$$

with a reduced memory footprint by restricting $f$ of the loss function to a specific set of functions and representing the time-forward simulation and backpropagation with a reduced dimensionality.

To compute $$\frac{\partial L}{\partial x_i}$$

without storing $\mathcal{X}_i$ values for all of $i$, the generic loss function $f(\mathcal{X}_i, \ldots, x_n)$ of the loss operation L is restricted to the set of functions where:

$$f(x_i, \ldots, x_n) = f(u_i(x_i), \ldots, u_n(x_n)), \quad (7)$$

where $u_i$ is low-dimensional, which allows for arbitrarily complex $f$ to remain tractable, and the backpropagation operation $$\frac{df}{dx_i} = \frac{df}{du_i}\frac{du_i}{dx_i}$$

to be performed efficiently. That is, one can multiply a gradient by $$\frac{du_i}{dx_i}$$

efficiently. Such a formulation may be convenient in that it allows for the FDTD method to return a simplified output $u_i$ which that user can then safely insert into an arbitrarily complex loss function $f$ while being protected from memory footprint issues (e.g., storing $\mathcal{X}_i$ values for all of $i$ is not necessary).

In one embodiment, a constant u is chosen for all $\mathcal{X}_i$, such as $u_i(x_i) = c^T \mathcal{X}_i$, where $x_i \in \mathbb{R}^m$ represents the fields at time step $i$ and $c \in \mathbb{R}^{m \times p}$, and p<<m. Such a choice of u is tractable since $$\frac{du_i}{dx_i} = c,$$

which is efficient since it only involves the storage of a constant c instead of needing to store all $\mathcal{X}_i$ states and can intuitively be thought of as a modal decomposition of the fields into the p output modes of interest.

In another embodiment, a single u is chosen across all $\mathcal{X}_i$, such that $f(x_1, \ldots, x_n) = f(u(x_1, \ldots, x_n))$, where $(x_1, \ldots, ux_n) = \Sigma_i c_i^T x_i$, $c_i \in \mathbb{R}^{m \times p}$, and p<<m. As compared to the embodiment in which the constant c is chosen, this embodiment is even more restrictive in the sense that the expected time variation is already determined by u (although there is some flexibility possible while still preserving memory efficiency, such as allowing for an arbitrary time delay). What is particularly poignant about this embodiment is that the gradient $$\frac{df}{dx_i}$$

across all $\mathcal{X}_i$ can be determined a priori, before even performing the simulation. This would allow for both the time-forward simulation and the time-backward simulation (e.g., backpropagation or adjoint operations) to proceed in parallel. The final structural gradient $$\frac{dL}{dz}$$

would then be arrived at by combining the time-forward and time-backward simulation in the appropriate way.

Once $$\frac{\partial L}{\partial x_i}$$

can be computed with a reduced memory footprint as described above, it can be assumed there is an efficient path to obtaining the adjoint fields $$\frac{dL}{dx_i}.$$

In light of this, it is possible to use the linearity of both terms in the definition of $$\frac{dL}{dz}$$

as described in equation (2). Specifically, by extracting decomposition components such as performing Fourier decompositions in time reduced representations of $$\frac{dL}{dx_i}$$

and $\mathcal{X}_i$ may be determined. In one embodiment, $$\frac{dL}{dx_i} = \Sigma_\omega R(\omega) e^{j\omega i}$$

and $x_i = \Sigma_\omega S(\omega) e^{j\omega i}$, such that the individual $R(\omega)e^{j\omega i}$ and $S(\omega)e^{j\omega i}$ terms would independently satisfy the adjoint and normal update equations respectively. It is noted that we use $j$ as the imaginary number for clarity. Since $$\frac{\partial x_i}{\partial z}$$

is also linear with respect to $x_i$, it can be written as follows:

$$\frac{\partial x_i}{\partial z} = \Sigma_\omega U(\omega)e^{j\omega i}, \qquad (8)$$

which allows for considering $$\frac{dL}{dz}$$

on a per-frequency basis (e.g., with a reduced representation):

$$\frac{dL}{dz}\bigg|_\omega = \sum_i U(R(\omega)e^{j\omega i})(S(\omega)e^{j\omega i}).$$

Deriving $$\frac{dL}{dz}\bigg|_\omega$$

allows for computing $$\frac{dL}{dz}$$

with a reduced memory footprint. Namely, that only a select number of frequencies of interest (e.g., $\omega$) would be chosen to make up the composition of $$\frac{dL}{dz}$$

at any one time, and that the number of $\omega$ would be adapted to fit within a predetermined memory budget. In some embodiments, the electromagnetic device having structural parameters being optimized operates within the frequencies of interest.

Figure 4:
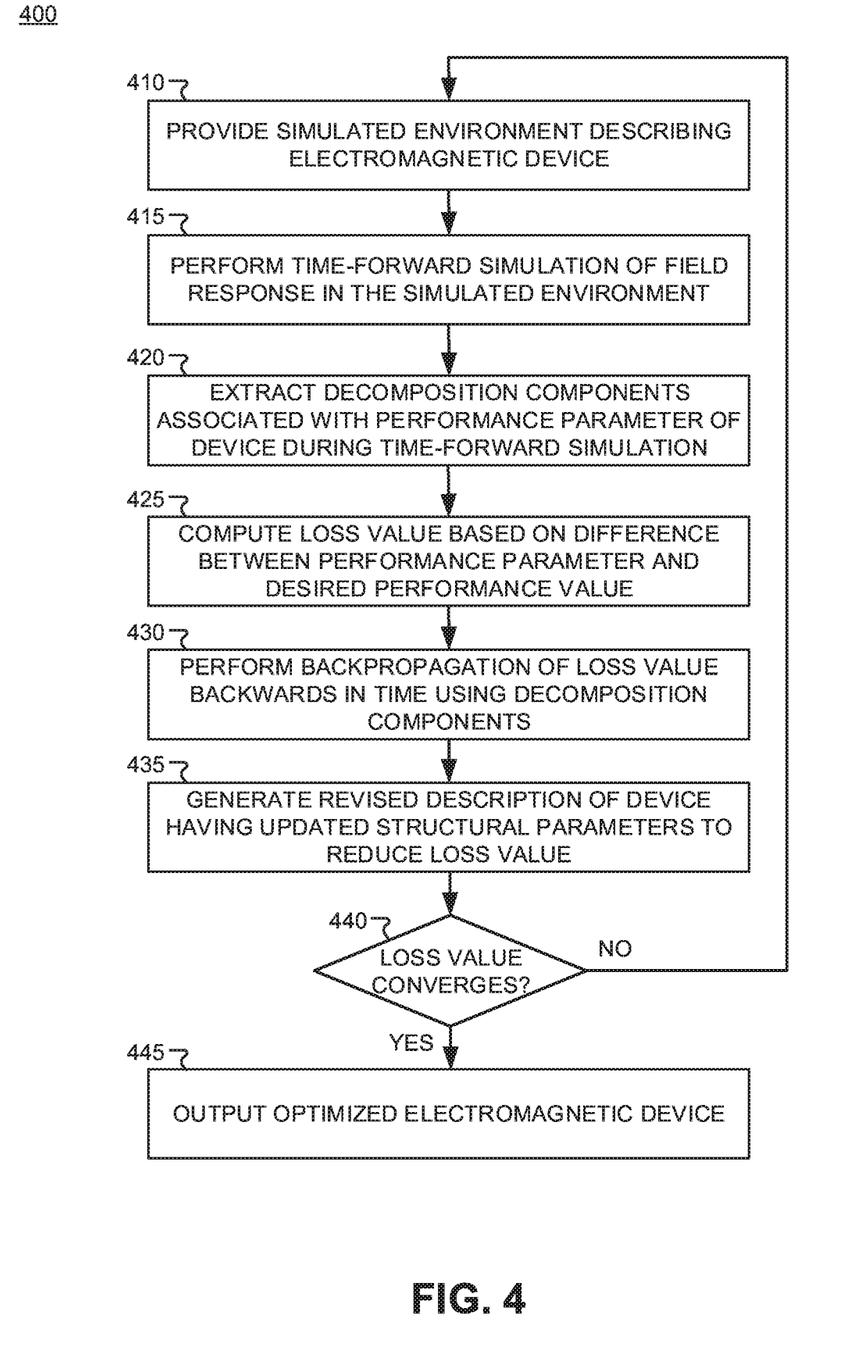
FIG. 4 illustrates a method for optimizing structural parameters of an electromagnetic device, in accordance with an embodiment of the present disclosure.

FIG. 4 illustrates a method 400 for optimizing structural parameters of an electromagnetic device, in accordance with an embodiment of the present disclosure.

Block 410 illustrates providing a simulated environment describing an electromagnetic device via a plurality of voxels. Each of the plurality of voxels is associated with a structural value to describe the structural parameters of the electromagnetic device, a field value to describe the field response (e.g., the electric and magnetic fields), and a source value to describe an excitation source. In one embodiment, the simulated environment includes a design region that includes a portion of the plurality of voxels which have structural parameters that may be updated, revised, or otherwise changed to optimize the structural parameters of the electromagnetic device.

In other embodiments, the structural parameters of the entirety of the simulated environment may be revised to optimize the structural parameters of the electromagnetic device. In some embodiments the electromagnetic device operates at one or more frequencies of interest. In the same or other embodiments, the electromagnetic device is an optical waveguide and the structural parameters are associated with geometric boundaries of the electromagnetic device based on the material properties (e.g., relative permittivity, index of refraction, etc.) of the simulated environment.

Block 415 shows performing a time-forward simulation of the field response in the simulated environment. The time forward simulation occurs over a plurality of time steps from an initial time step to a final time step. The field response is based, at least in part, on the excitation source and the structural parameters describing the electromagnetic device. To perform the time-forward simulation, the field value is incrementally updated over the plurality of time steps for each of the plurality of voxels. In some embodiments, the field response at an arbitrary one of the plurality of time steps is linearly related with respect to a field value and a source value at an immediately prior time step included in the plurality of time steps.

Block 420 illustrates extracting decomposition components from the field response associated with a performance parameter of the electromagnetic device while performing the time-forward simulation. The decomposition components represent a reduced dimensionality representation of the field response such that storage of the field response at each of the plurality of time steps is not necessary. In some embodiments, the decomposition components are Fourier components based on the field response describing the performance parameter at the one or more frequencies of interest.

Block 425 shows computing a loss value based, at least in part, on a difference between the performance parameter at a time step (e.g., the final time step included in the plurality of time steps) of the time-forward simulation and a desired performance value.

Block 430 illustrates performing backpropagation of the loss value backwards in time using the decomposition components to determine an influence in changes of the structural parameters of the electromagnetic device on the loss value. The backpropagation using the decomposition components determines the contribution of changes to the structural parameters on the loss value for each of the plurality of voxels at each of the plurality of time steps. In some embodiments, the backpropagation of the loss value corresponds to a time-backwards simulation in which the excitation source of the time-backwards simulation is based, at least in part, on the loss value. When performing the time-backward simulation, a change in the field response is incrementally updated over the plurality of time steps for each of the plurality of voxels backwards in time. The change in the field response is based, at least in part, on the loss value. In some embodiments, while performing the backpropagation of the loss value, decomposition components of the loss value (e.g., a loss gradient) are extracted. In one embodiment, the decomposition components of the field components are combined with the decomposition components of the loss value to determine an influence in changes of the structural parameters to the loss value.

Block 435 shows generating a revised description of the electromagnetic device by optimizing the structural parameters to reduce the loss value. In some embodiments, the revised description is generated by utilizing an optimization scheme after a cycle of time-forward simulation and the backpropagation via a gradient descent algorithm. In some embodiments, after the structural parameters are adjusted to reduce the loss value it is determined whether a change (e.g., the adjustment) of the structural parameters when performing a successive cycle of the time-forward simulation and the backpropagation is within predetermined fabrication constraints.

Block 440 illustrates determining whether the loss value substantially converges such that the difference between the performance parameter and the desired performance value is within a threshold range. Iterative cycles of successively performing the time-forward simulation, performing the backpropagation of the loss value, and adjusting the structural parameters (e.g., optimization) to reduce the loss value are performed repeatedly until the loss value is reduced to be within the threshold range.

Block 445 illustrates outputting an optimized electromagnetic device in which the structural parameters have been updated to have the difference between the performance parameter and the desired performance value within a threshold range.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible machine-readable storage medium includes any mechanism that provides (i.e., stores) information in a non-transitory form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A computer-implemented method for optimizing structural parameters of an electromagnetic device, the method comprising:
    performing a time-forward simulation of a field response in a simulated environment describing the electromagnetic device, wherein the simulated environment describes the electromagnetic device via a plurality of voxels, wherein each of the plurality of voxels is associated with a structural value to describe the structural parameters, a field value to describe the field response, and a source value to describe an excitation source, and wherein the field response is based, at least in part, on the structural parameters and the excitation source;
    incrementally updating the field value over a plurality of time steps for each of the plurality of voxels to perform the time-forward simulation;
    extracting decomposition components from the field response associated with a performance parameter of the electromagnetic device while performing the time-forward simulation;
    computing a loss value based on a difference between the performance parameter at a time step included in the plurality of time steps of the time-forward simulation and a desired performance value;
    backpropagating the loss value from the time step using the decomposition components to determine an influence of changes in the structural parameters of the electromagnetic device on the loss value; and
    generating a revised description of the electromagnetic device by updating the structural parameters to reduce the loss value.

2. The computer-implemented method of claim 1, wherein the decomposition components are Fourier components based on the field response describing the performance parameter at one or more frequencies of interest.

3. The computer-implemented method of claim 2, wherein the electromagnetic device operates at the one or more frequencies of interest.

4. The computer-implemented method of claim 1, wherein the time-forward simulation occurs over the plurality of time steps, including the time step, and wherein the field response at an arbitrary one of the plurality of time steps is linearly related with respect to a field value and a source value at an immediately prior time step included in the plurality of the time steps.

5. The computer-implemented method of claim 1, wherein the backpropagation using the decomposition components determines the influence of changes in the structural parameters to the loss value for each of the plurality of voxels at each of the plurality of time steps.

6. The computer-implemented method of claim 1, wherein the backpropagation of the loss value corresponds to a time-backwards simulation in which the excitation source of the time-backwards simulation is based on the loss value.

7. The computer-implemented method of claim 6, further comprising:
    incrementally updating a change in the field response over the plurality of time steps for each of the plurality of voxels backwards in time to perform the time-backward simulation, wherein the change in the field response is based on the loss value.

8. The computer-implemented method of claim 1, further comprising:
    iteratively performing cycles, each cycle including successively performing the time-forward simulation, performing the backpropagation of the loss value, and optimizing the structural parameters to reduce the loss value, wherein the cycles iteratively reduce the loss value until the loss value converges such that the difference between the performance parameter and the desired performance value is within a threshold range.

9. The computer-implemented method of claim 8, wherein a gradient descent algorithm is utilized for the iterative reduction of the loss value.

10. The computer-implemented method of claim 8 further comprising:
determining, after each of the cycles, whether the optimized structural parameters are within pre-determined fabrication constraints.

11. The computer-implemented method of claim 1, wherein the electromagnetic device is an optical waveguide, and wherein the structural parameters are associated with geometric boundaries of the electromagnetic device based on material properties of the simulated environment, and wherein the material properties include relative permittivity.

12. A system for optimizing structural parameters of a physical device, the system comprising:
a controller including one or more processors coupled to memory, wherein the memory stores instructions that when executed by the one or more processors cause the system to perform operations including:
performing a time-forward simulation of a field response in a simulated environment describing the physical device, wherein the simulated environment describes the physical device via a plurality of voxels, wherein each of the plurality of voxels is associated with a structural value to describe the structural parameters, a field value to describe the field response, and a source value to describe an excitation source, and wherein the field response is based, at least in part, on the structural parameters and the excitation source;
incrementally updating the field value over a plurality of time steps for each of the plurality of voxels to perform the time-forward simulation;
extracting decomposition components from the field response associated with a performance parameter of the physical device while performing the time-forward simulation;
computing a loss value based on a difference between the performance parameter at a time step included in the plurality of time steps of the time-forward simulation and a desired performance value;
backpropagating the loss value from the time step using the decomposition components to determine an influence of changes in the structural parameters of the physical device on the loss value; and
generating a revised description of the physical device by having the structural parameters optimized to reduce the loss value.

13. The system of claim 12, wherein the decomposition components are Fourier components based on the field response describing the performance parameter at one or more frequencies of interest.

14. The system of claim 13, wherein the physical device operates at the one or more frequencies of interest.

15. The system of claim 12, wherein the time-forward simulation occurs over a plurality of time steps, including the time step, and wherein the field response at an arbitrary one of the plurality of time steps is linearly related with respect to a field value and a source value at an immediately prior time step included in the plurality of the time steps.

16. The system of claim 12, further comprising:
a display adapted to show the simulated environment describing the physical device; and
an input device adapted to receive an input describing the simulated environment, wherein the controller is further coupled to the display and the input device.

17. A non-transitory computer-readable storage medium having stored thereon instructions which, when executed by one or more processing units, cause the one or more processing units to perform operations comprising:
performing a time-forward simulation of a field response in a simulated environment describing an electromagnetic device, wherein the simulated environment describes the electromagnetic device via a plurality of voxels, wherein each of the plurality of voxels is associated with a structural value to describe the structural parameters, a field value to describe the field response, and a source value to describe an excitation source, and wherein the field response is based, at least in part, on the structural parameters and the excitation source;
incrementally updating the field value over a plurality of time steps for each of the plurality of voxels to perform the time-forward simulation;
extracting decomposition components from the field response associated with a performance parameter of the electromagnetic device while performing the time-forward simulation;
computing a loss value based on a difference between the performance parameter at a time step included in the plurality of time steps of the time-forward simulation and a desired performance value;
backpropagating the loss value from the time step using the decomposition components to determine an influence of changes in the structural parameters of the electromagnetic device on the loss value; and
generating a revised description of the electromagnetic device by having the structural parameters optimized to reduce the loss value.

18. The non-transitory computer-readable medium of claim 17, wherein the decomposition components are Fourier components based on the field response describing the performance parameter at one or more frequencies of interest, and wherein the electromagnetic device operations at the one or more frequencies of interest.

19. The non-transitory computer-readable medium of claim 17, wherein the instructions, which when executed by the one or more processing units, cause the one or more processing units to perform further operations comprising:
incrementally updating a change in the field response over the plurality of time steps for each of the plurality of voxels backwards in time to perform a time-backward simulation, wherein the change in the field response is based on the loss value, and wherein the backpropagation of the loss value corresponds to the time-backwards simulation in which the excitation source for the time-backward simulation is based on the loss value.

20. The non-transitory computer-readable medium of claim 17, wherein the instructions, which when executed by the one or more processing units, cause the one or more processing units to perform further operations comprising:
iteratively performing cycles, each cycle including successively performing the time-forward simulation, performing the backpropagation of the loss value, and optimizing the structural parameters to reduce the loss value, wherein the cycles iteratively reduce the loss value until the loss value converges such that the difference between the performance parameter and the desired performance value is within a threshold range.

* * * * *